United States Patent
Huang et al.

(10) Patent No.: US 8,665,529 B2
(45) Date of Patent: Mar. 4, 2014

(54) ZOOM LENS

(75) Inventors: Huai-Yi Huang, Taipei (TW); Jer-Yuan Sheu, Taipei (TW)

(73) Assignee: Ability Enterprise Co., Ltd., Taipei (TW)

( * ) Notice: Subject to any disclaimer, the term of this patent is extended or adjusted under 35 U.S.C. 154(b) by 103 days.

(21) Appl. No.: 13/309,162

(22) Filed: Dec. 1, 2011

(65) Prior Publication Data
US 2012/0262802 A1   Oct. 18, 2012

(30) Foreign Application Priority Data
Apr. 12, 2011 (TW) .............................. 100112688 A (51) Int. Cl.
*G02B 15/14* (2006.01)

(52) U.S. Cl.
USPC ........................................... 359/682

(58) Field of Classification Search
USPC ................................. 359/680–682
See application file for complete search history.

(56) References Cited

U.S. PATENT DOCUMENTS

| | | | | |
|---|---|---|---|---|
| 6,917,476 B2 * | 7/2005 | Eguchi | ........................ | 359/689 |
| 6,972,908 B2 * | 12/2005 | Noda | ............................ | 359/680 |
| 7,215,482 B2 * | 5/2007 | Matsusaka | .................... | 359/682 |
| 2005/0200971 A1 * | 9/2005 | Fujii | ............................. | 359/680 |
| 2010/0214665 A1 * | 8/2010 | Hatakeyama | ................. | 359/682 |

* cited by examiner

*Primary Examiner* — Darryl J Collins
(74) *Attorney, Agent, or Firm* — Rabin & Berdo, P.C.

(57) ABSTRACT

An embodiment of this invention provides a zoom lens, which comprises, in order from an object side to an image-forming side, a first lens group having negative refractive power, a second lens group having positive refractive power, and a third lens group having positive refractive power. Further, the zoom lens satisfies the following conditions: (1) DG1/fw>0.72; (2) DG2/fw<0.72; and (3) TTL/fw<7.0, wherein fw is the focal length of the optical zoom lens at a wide-angle end, DG1 is the thickness of the first lens group, DG2 is the thickness of the second lens group, and TTL is the total thickness of the zoom lens, i.e., the distance between the object side of the first lens group and an image-forming plane of the zoom lens.

20 Claims, 10 Drawing Sheets

ZOOM LENS

CROSS REFERENCE TO RELATED APPLICATIONS

The entire contents of Taiwan Patent Application No. 100112688, filed on Apr. 12, 2011, from which this application claims priority, are incorporated herein by reference.

BACKGROUND OF THE INVENTION

1. Field of the Invention

The present invention relates to zoom lenses, especially to zoom lenses with low cost, high zoom ratio, small size, and good image quality.

2. Description of the Prior Art

Image-capturing devices, such as digital cameras or digital camcorders, typically employ a zoom lens and an image sensor to collect an image beam of an object, in which the zoom lens focuses the image beam on the image sensor, which then turns analog signals of the image beam into digital signals for following processing, transmitting, and storage.

Typically, the zoom lens of the image-capturing devices consists of several lenses or prisms. To offer competitive prices and lower the weight, plastic lenses are employed as possible to replace glass lenses; however, the plastic lenses come with the disadvantages of moisture and light absorption, and conflict may appear between small size, high zoom ratio, and good image quality when reducing the cost.

Therefore, it would be advantageous to provide novel zoom lenses having advantages of compact size, high zoom ratio, and good image quality when reducing the cost.

SUMMARY OF THE INVENTION

An object of the present invention is to provide novel zoom lenses having advantages of compact size, high zoom ratio, and good image quality. In addition, the wide-angle of the optical zoom lens can be featured.

Accordingly, one embodiment of this invention provides a zoom lens that primarily comprises, in order from an object side to an image-forming side, a first lens group having negative refractive power, a second lens group having positive refractive power, a third lens group having positive refractive power, and the optical zoom lens satisfies the following conditions: (1) $DG1/fw > 0.72$; (2) $DG2/fw < 0.72$; and (3) $TTL/fw < 7.0$, wherein fw is the focal length of the zoom lens at a wide-angle end, DG1 is the thickness of the first lens group, DG2 is the thickness of the second lens group, and TTL is the total thickness of the zoom lens, i.e., the distance between the object side of the first lens group and an image-forming plane of the zoom lens.

By the features described above, the zoom lens of this invention has more compact size, lower cost, and better image quality than conventional ones.

DESCRIPTION OF THE PREFERRED EMBODIMENT

Reference will now be made in detail to specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known components and process operations are not been described in detail in order not to unnecessarily obscure the present invention. While drawings are illustrated in details, it is appreciated that the quantity of the disclosed components may be greater or less than that disclosed, except expressly restricting the amount of the components.

Figure 1A:
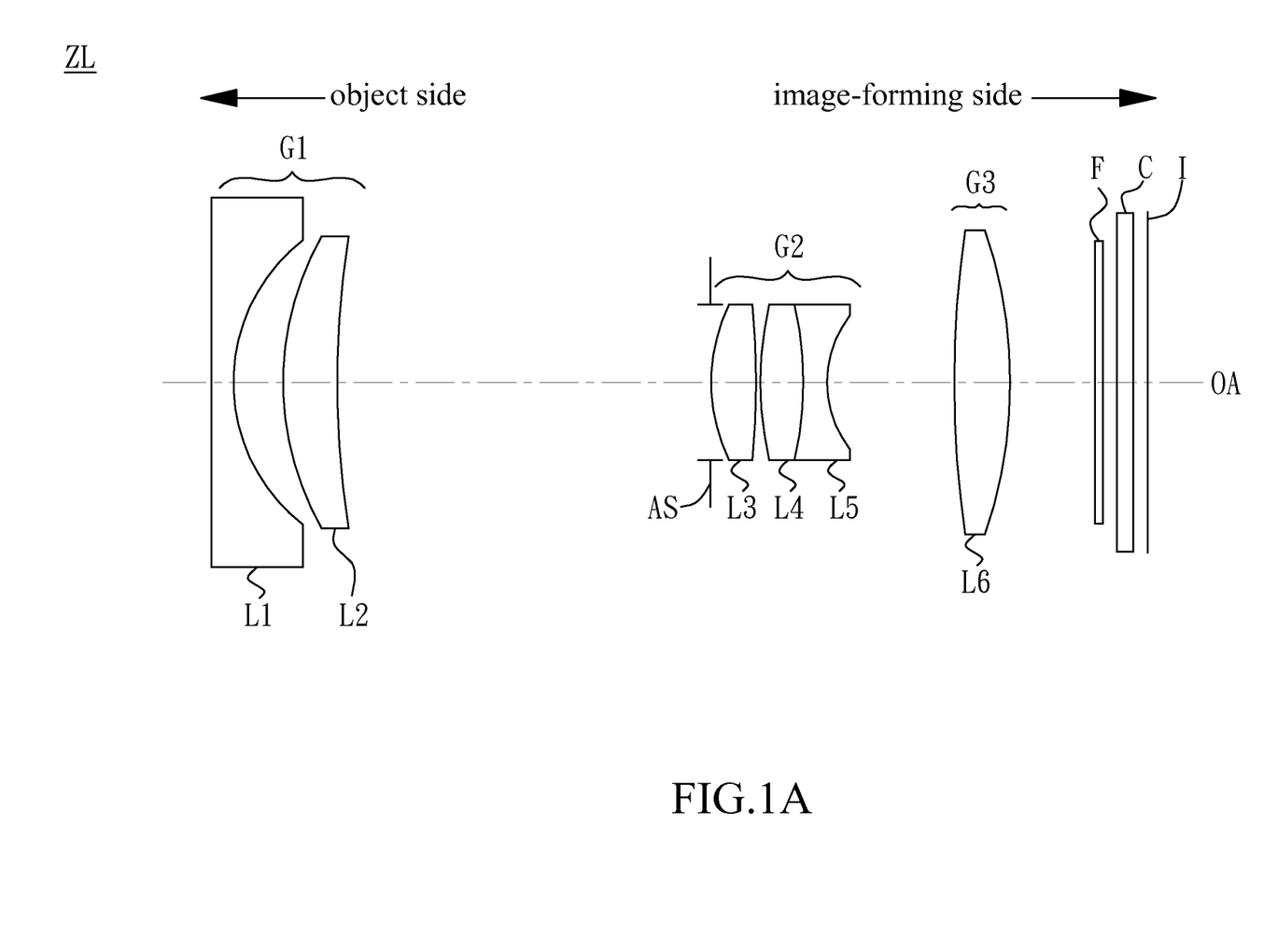
FIG. 1A and FIG. 1B, respectively, show a zoom lens at the wide-angle end and the telephoto end, according a preferred embodiment of this invention.
Figure 1B:
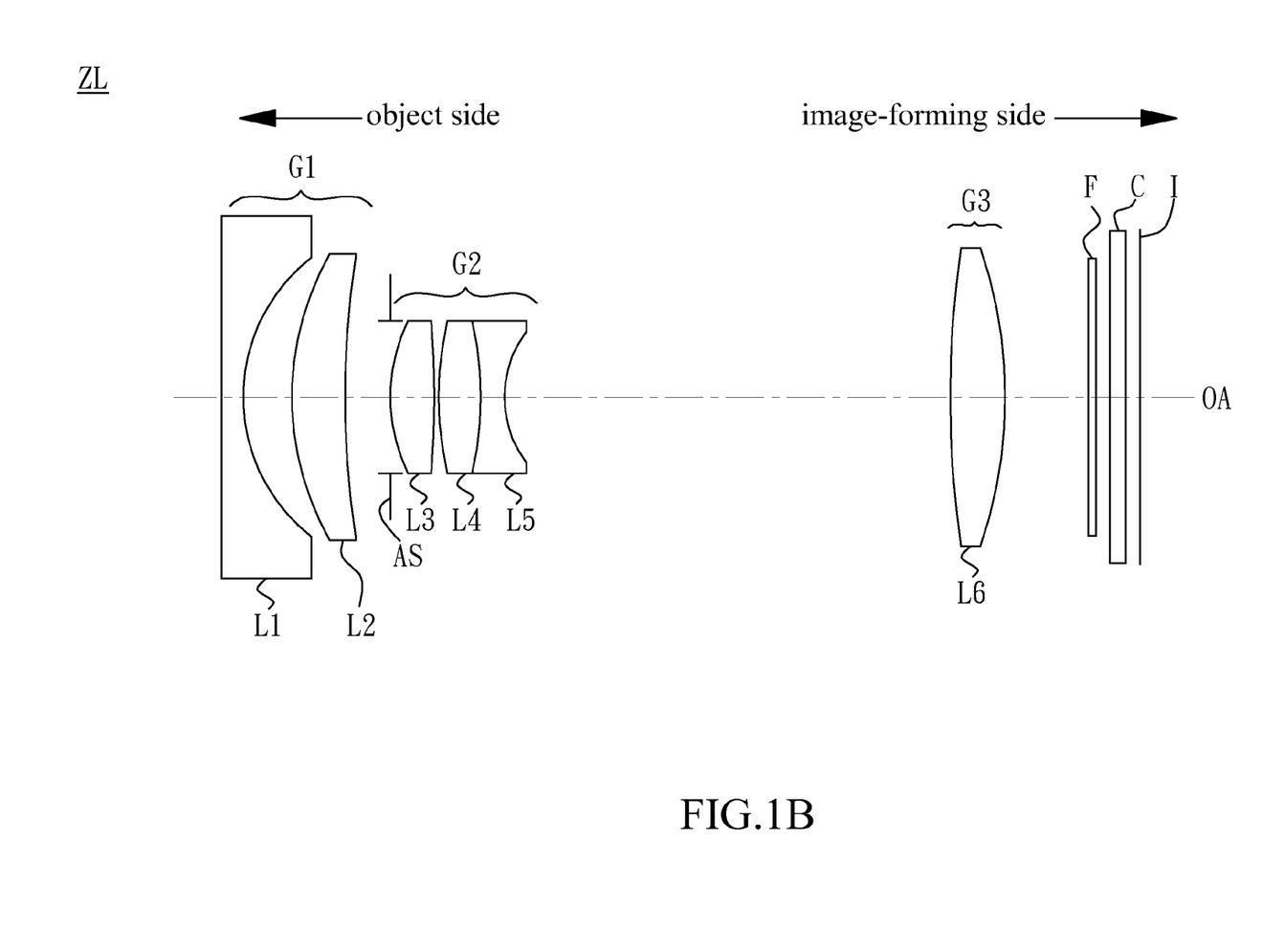

FIG. 1A and FIG. 1B show a zoom lens ZL according a preferred embodiment of this invention, wherein FIG. 1A shows the position of every lens in the wide-angle end and FIG. 1B shows the position of every lens in the telephoto end. To highlight features of the optical zoom lens ZL, the drawings merely show related components of this embodiment, and omit irrelevant or minor components. The zoom lens illustrated by this embodiment may be employed in an electronic device capable of catching images, such as a digital camera, a digital camcorder, or a cellular phone.

As shown in FIG. 1A and FIG. 1B, the zoom lens ZL primarily consists, in order from an object side to an image-forming side, of a first lens group G1, a second lens group G2, and a third lens group G3, in which the first lens group G1 has negative refractive power, the second lens group G2 has positive refractive power, and the third lens group G3 has positive refractive power.

For needs of compact size, low cost, high zoom ratio, widened wide-angle, and good image quality, the zoom lens ZL satisfies the following conditions:

$$DG1/fw > 0.72; \tag{1}$$

$$DG2/fw < 0.72; \text{ and} \tag{2}$$

$$TTL/fw < 7.0, \tag{3}$$

wherein fw denotes the focal length of the zoom lens at the wide-angle end, DG1 denotes the thickness of the first lens group, DG2 denotes the thickness of the second lens group, and TTL denotes the total thickness of the zoom lens ZL, i.e., the distance between the object side of the first lens group G1 and an image-forming plane I of the zoom lens ZL.

In this preferred embodiment, DG1 equals 3.62 mm, DG2 equals 3.5 mm, fw equals 4.99 mm, and the focal length of the zoom lens at the telephoto end is 24.01 based on the foregoing parameters.

In addition, preferably, the zoom lens ZL further satisfies the following condition:

$$\text{Wide } Fno<2.8, \quad (4)$$

Wherein "Wide Fno" denotes the F-number of the optical zoom lens at the wide-angle end.

In addition, preferably, the zoom lens ZL further satisfies the following condition:

$$\text{Tele } Fno<7.0, \quad (5)$$

Wherein "Tele Fno" denotes the F-number of the zoom lens at the telephoto end.

As shown in FIG. 1A and FIG. 1B, the zoom lens ZL may further comprise an optical axis OA, an aperture stop AS, a filter F, and the image-forming plane I. The aperture stop AS may be arranged between the first lens group G1 and the second lens group G2, for limiting the light flux of the image beam that has passed through the first lens group G1 into the second lens group G2, and making the image beam more symmetrical. Particularly, the diameter of the aperture stop AS may be a constant. The filter F may be arranged between the third lens group G3 and the image-forming plane I, for filtering invisible light off the image beam. The filter F may be an infrared light filter. The image-forming plane denotes an image-capturing unit having light-to-electricity conversion function, for receiving image beam passing through the filter F. In addition, a flat lens C, as a cover glass of the image-capturing unit, may be arranged between the image-forming plane I and the filter F.

In this embodiment, when the zoom ratio and the focal length of the zoom lens ZL need to be adjusted, the first lens group G1, the second lens group G2, and the third lens group G3 will be moved along the optical axis with respect to one another, so as to determine a zoom ratio and adjust the focal length.

Referring to FIG. 1A and FIG. 1B again, preferably, the zoom lens ZL comprises at least two plastic lenses, and each of the lens groups, including group G1, group G2, and group G3, respectively, comprises an aspheric lens or a free-form lens. The plastic may comprise, but is not limited to, resins or polymers, such as polycarbonate, cyclic olefin copolymer (e.g. APEL), polyester resins (e.g. OKP4 or OKP4HT), and the like. In addition, at least one surface of each free-form lens is a free-form freedom surface, and at least one surface of each aspheric lens is an aspheric surface satisfying the following equation (6):

$$Z = \frac{CY^2}{1+\sqrt{1-(K+1)C^2Y^2}} + A_4Y^4 + A_6Y^6 + A_8Y^8 + A_{10}Y^{10} + A_{12}Y^{12}, \quad (6)$$

where Z is the coordinate in the optical axis OA direction in which direction light propagates as positive; $A_4$, $A_6$, $A_8$, $A_{10}$, and $A_{12}$ are aspheric coefficients; K is coefficient of quadratic surface; R is the radius of curvature; C is reciprocal of R (C=1/R); Y is the coordinate in a direction perpendicular to the optical axis in which the upward direction as positive; and coefficients of equation (6) of each aspheric lens are predetermined to determine the focal length and thus satisfy the above-mentioned conditions.

In this preferred embodiment, the first lens group G1 comprises, in order from the object side to the image-forming side, a first lens L1 having negative refractive power and a second lens L2 having positive refractive power. The second lens group G2 comprises, in order from the object side to the image-forming side, a third lens L3 having positive refractive power, a fourth lens L4 having positive refractive power, and a fifth lens L5 having negative refractive power. The third lens group G3 comprises a sixth lens L6 having positive refractive power.

Preferably, the first lens L1, the fourth lens L4, and the fifth lens L5 are spherical lenses with two spherical surfaces. Further, the second lens L2 is made of plastic and is an aspheric lens with two aspheric surfaces or a free-form lens with two free-form freedom surface, the second lens L3 is made of glass and is an aspheric lens with two aspheric surfaces or a free-form lens with two free-form freedom surface, the second lens L6 is made of plastic and is an aspheric lens with two aspheric surfaces or a free-form lens with two free-form freedom surface, and the fourth lens L4 and the fifth lens L5 may be glued to be a doublet lens. Modifications may be made for the above structures. A polish or a glass molding process (GMP), using an optical grade glass material, may be used to fabricate the glass lenses, and an injection molding process, using a polymer as the material, may be used to fabricate the plastic lenses. Particularly, the polish process is suitable for producing the spherical glass lenses, the GMP process suitable for the aspheric glass lenses.

In this preferred embodiment, the second lens L2 further satisfies the following conditions:

$$nd2>1.6 \text{ and } vd2<50, \quad (7)$$

wherein nd2 denotes the refractive index of the second lens L2, and vd2 denotes the Abbe number of the second lens L2.

In addition, in this preferred embodiment, the sixth lens L6 further satisfies the following conditions:

$$nd6<1.6 \text{ and } vd6>50, \quad (8)$$

wherein nd6 denotes the refractive index of the sixth lens L6, and vd6 denotes the Abbe number of the sixth lens L6.

Table 1 lists the detail information of the zoom lens ZL shown in FIG. 1A and FIG. 1B, according to an example of this invention. The information includes the curvature radius, the thickness, the refractive index, and the Abbe number of lenses or every surface of lenses in the zoom lens, where the surface numbers are sequentially ordered from the object side to the image-forming side. For example, "S1" stands for the surface of the first lens L1 facing the object side, "S2" stands for the surface of the first lens L1 facing the image-forming side, "S3" stands for the surface of the second lens L2 facing the object side, "S13" and "S14" respectively stands for the surface of the filter F facing the object side and the image-forming side, "S15" and "S16" respectively stands for the surface of the flat lens C facing the object side and the image-forming side, and so on.

TABLE 1

| lens No. | Surface No. | curvature radius (mm) | thickness (mm) | refractive index | Abbe no. |
|---|---|---|---|---|---|
| L1 | S1 | 200 | 0.750 | 1.729 | 54.68 |
|  | S2 | 6.801 | 1.350 |  |  |
| L2 | S3 | 8.713 | 1.520 | 1.632 | 23.24 |
|  | S4 | 15 | D1 |  |  |
|  | AS | ∞ | 0 |  |  |
| L3 | S6 | 5.646 | 1.310 | 1.693 | 53.2 |
|  | S7 | −24.597 | 0.100 |  |  |
| L4 | S8 | 11.893 | 1.26 | 1.804 | 46.57 |
| L5 | S9 | −7.773 | 0.830 | 1.673 | 32.10 |
|  | S10 | 3.521 | D2 |  |  |
| L6 | S11 | 90.7 | 1.650 | 1.544 | 56.26 |
|  | S12 | −10.531 | D3 |  |  |
| F | S13 | ∞ | 0.300 | 1.517 | 64.17 |
|  | S14 | ∞ | 0.400 |  |  |

TABLE 1-continued

| lens No. | Surface No. | curvature radius (mm) | thickness (mm) | refractive index | Abbe no. |
|---|---|---|---|---|---|
| C | S15 | ∞ | 0.500 | 1.517 | 64.17 |
|   | S16 | ∞ | 0.400 |       |       |
|   | I   | ∞ |       |       |       |

In table 1, the "thickness" stands for the distance between the indicated surface and the next. For example, the thickness of the surface S1 is the distance between the surface S1 and the surface S2, and the thickness of the surface S2 is the distance between the surface S2 and the surface S3. In addition, the thickness labeled with D1, D2, or D3 indicates that the thickness is a variable depending on the wide-angle end or the telephoto end, and Table 2 lists the detail.

TABLE 2

| thickness | Wide-angle end (mm) | Telephoto end (mm) |
|---|---|---|
| D1 | 16.640 | 0.680 |
| D2 | 3.339  | 21.924 |
| D3 | 3.451  | 2.453 |

Furthermore, in this example, the second lens L2, the third lens L3, and the sixth lens L6 are aspheric lenses with two aspheric surfaces, i.e., the surfaces S3, S4, S6, S7, S11 and S12 are aspheric surfaces. The aspheric coefficients of the aspheric surfaces are listed in Table 3.

TABLE 3

|     | K | $A_4$ | $A_6$ | $A_8$ | $A_{10}$ | $A_{12}$ |
|---|---|---|---|---|---|---|
| S3  | -10.10648 | 1.4543033E-03  | -1.2782290E-04 | 6.5235398E-06 | -1.4533500E-07 | 1.1284676E-09 |
| S4  | -19.05385 | 7.4250120E-05  | -7.3560061E-05 | 5.2370634E-06 | -1.4688900E-07 | 1.3684555E-09 |
| S6  | 0 | -8.1310877E-04 | -1.6042390E-04 | 2.5684330E-05 | -3.1300400E-06 | 0 |
| S7  | 0 | 5.1459941E-05  | -3.9111094E-05 | 2.9605709E-06 | -1.5951300E-06 | 0 |
| S11 | 0 | -2.2832074E-04 | 3.1907329E-06  | 2.0784192E-06 | -6.8899100E-08 | 0 |
| S12 | 0 | 1.4758840E-04  | -1.6838144E-05 | 3.2519077E-06 | -9.2702600E-08 | 0 |

Figure 2A:
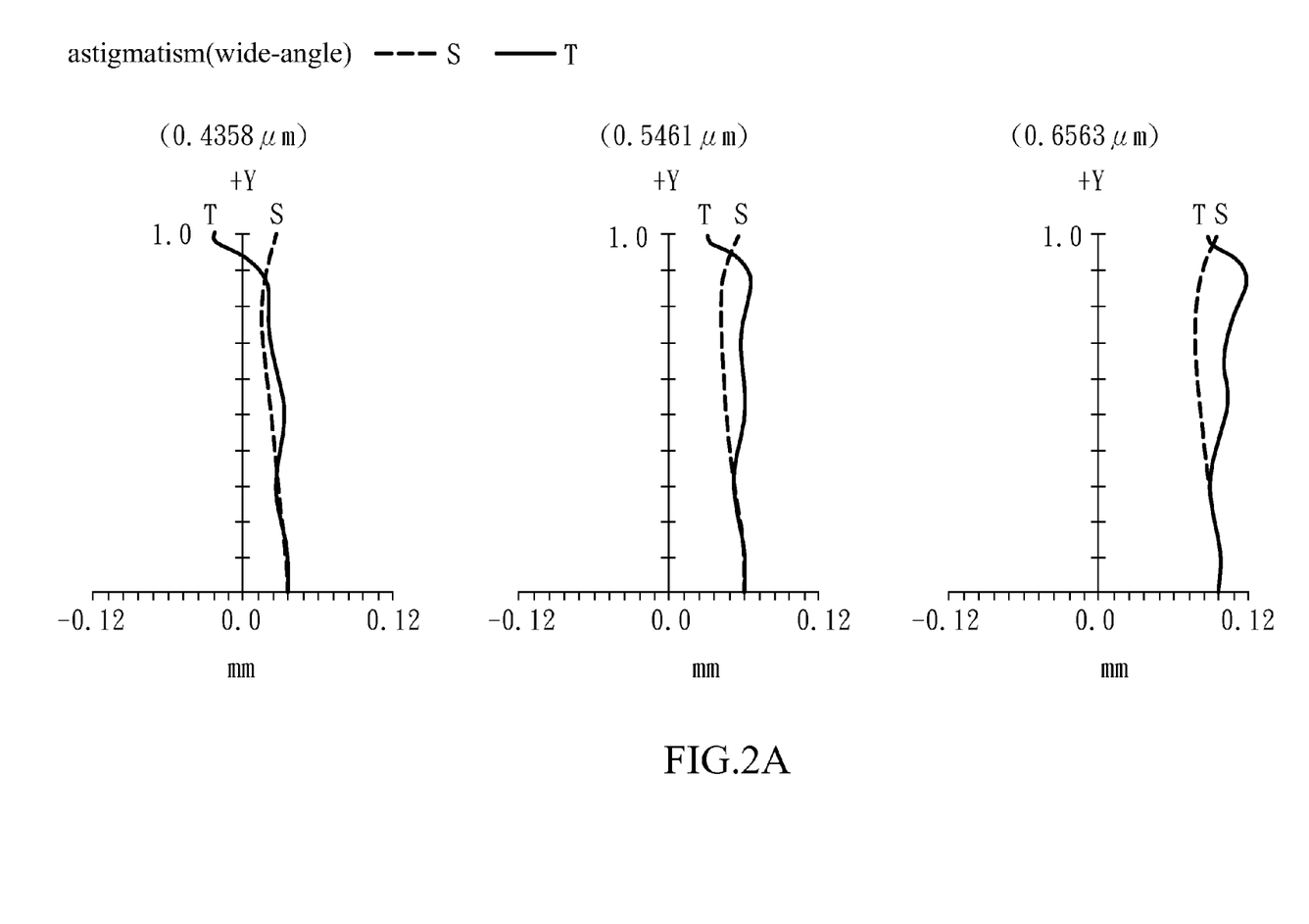
FIG. 2A and FIG. 2B, respectively, show the astigmatism chart of the zoom lens at the wide-angle end and the telephoto end, according to an example of this invention.
Figure 2B:
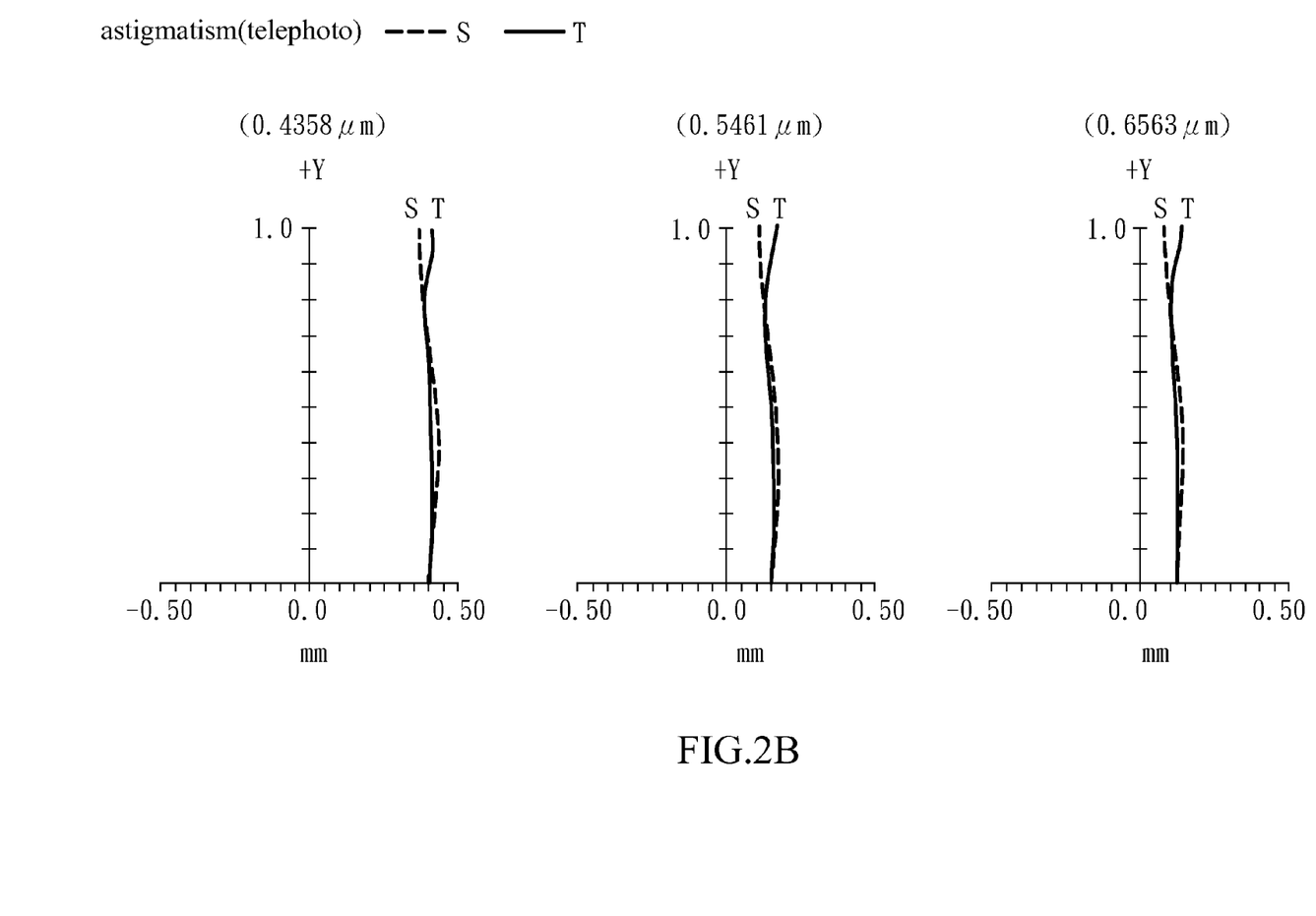

FIG. 2A and FIG. 2B respectively show the astigmatism chart of the zoom lens at the wide-angle end and the telephoto end, according to an example of this invention, where curves T and S stand for the aberration of the zoom lens to the tangential rays and the sagittal rays for image beams with wavelength 435.8 nm, 546.1 nm, and 656.3 nm; in the wide angle end, S (i.e. tangential value) and T (i.e. sagittal value) are all set in the range of (−0.03 mm, 0.12 mm); in the telephoto end, S and T are all set in the range of (0.07 mm, 0.44 mm).

Figure 3A:
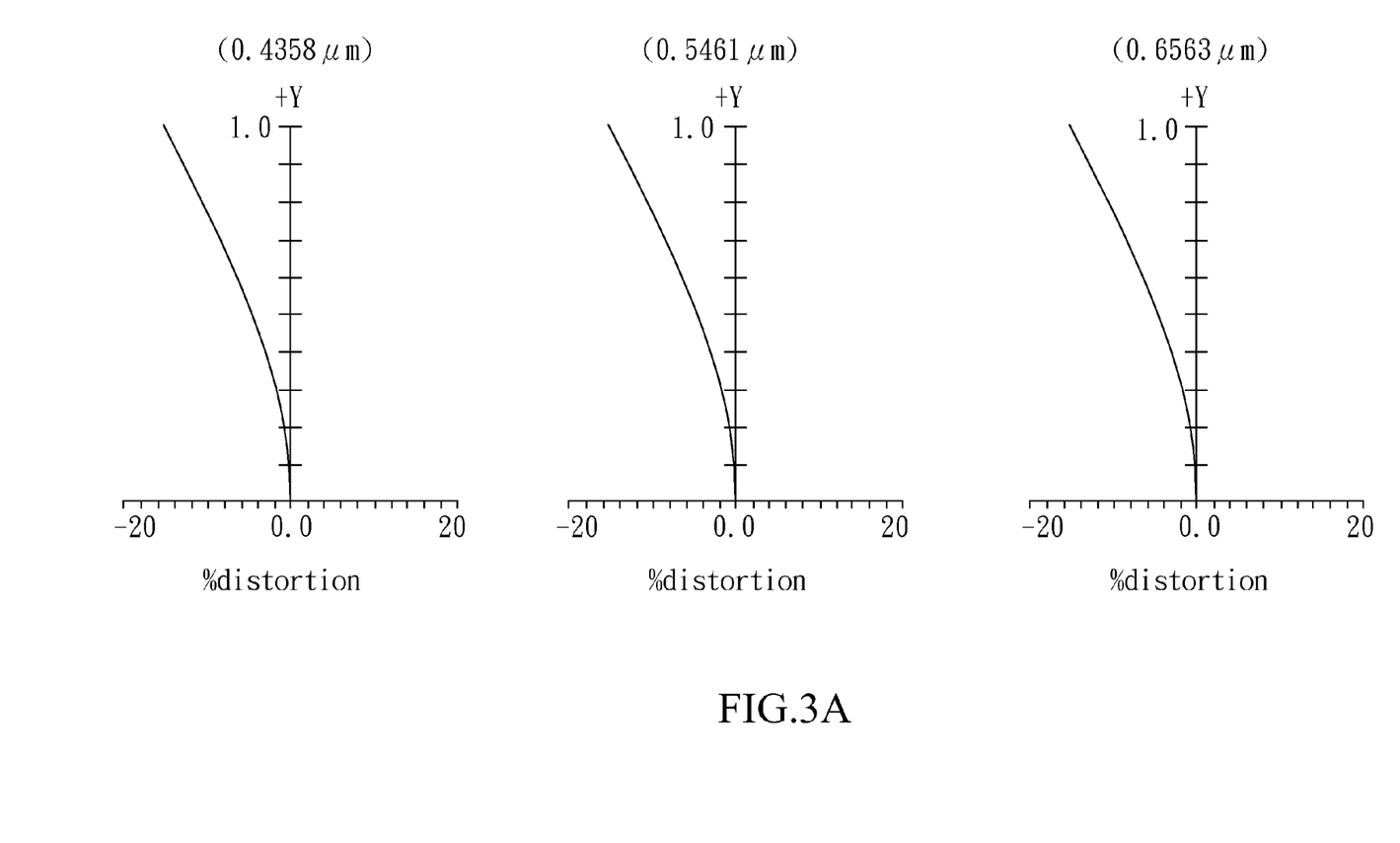
FIG. 3A and FIG. 3B, respectively, show the distortion chart of the zoom lens at the wide-angle end and the telephoto end, according to an example of this invention.
Figure 3B:
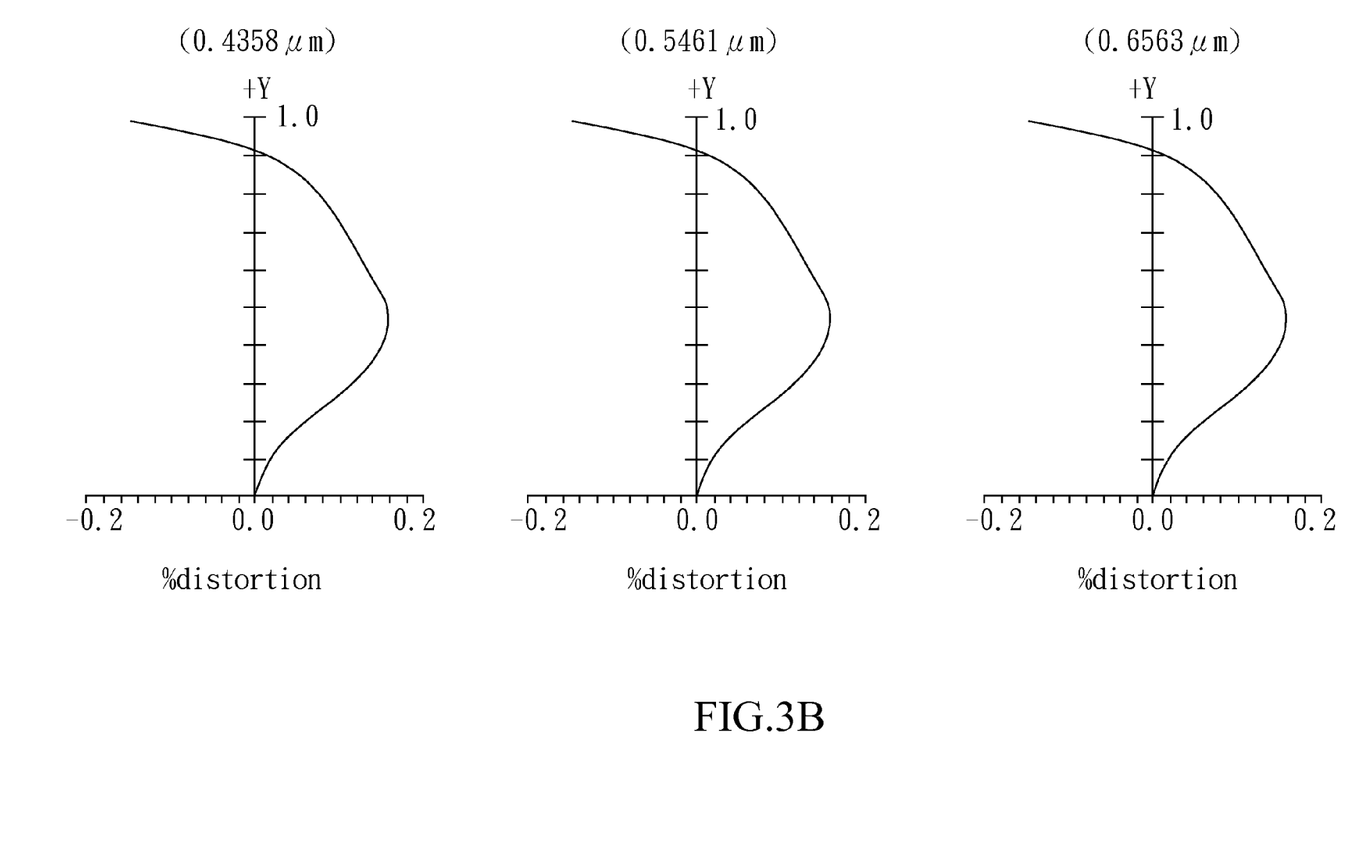

FIGS. 3A and 3B respectively show the distortion chart of the zoom lens at the wide-angle end and the telephoto end, according to an example of this invention. As shown in the drawings, in the wide-angle end the distortion value for image beams with wavelength 435.8 nm, 546.1 nm, and 656.3 nm are all set in the range of (−16%, 0%) while (−0.16%, 0.17%) in the telephoto end.

Figure 4A:
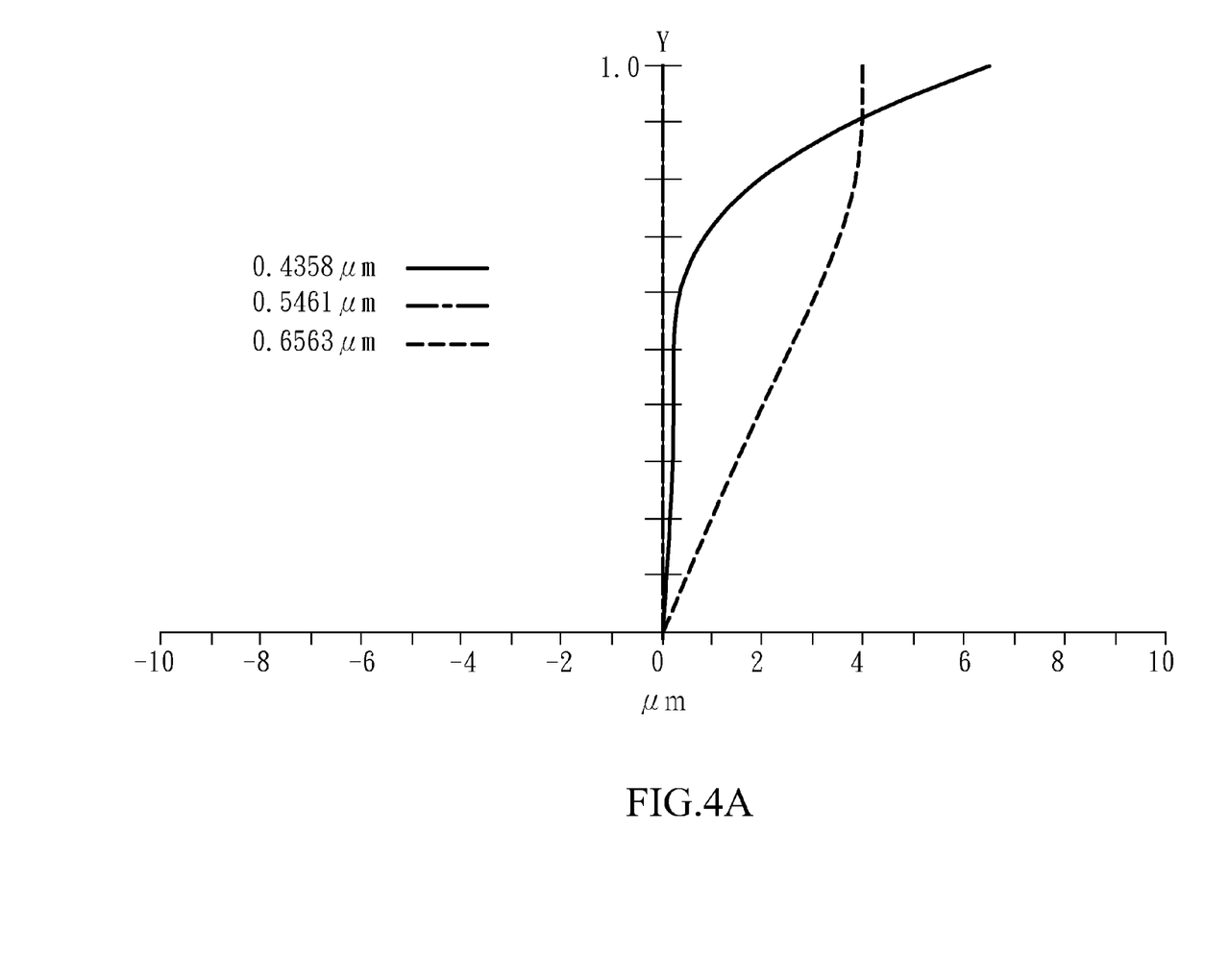
FIG. 4A and FIG. 4B, respectively, show the lateral color chart at the wide-angle end and the telephoto end, according to an example of this invention.
Figure 4B:
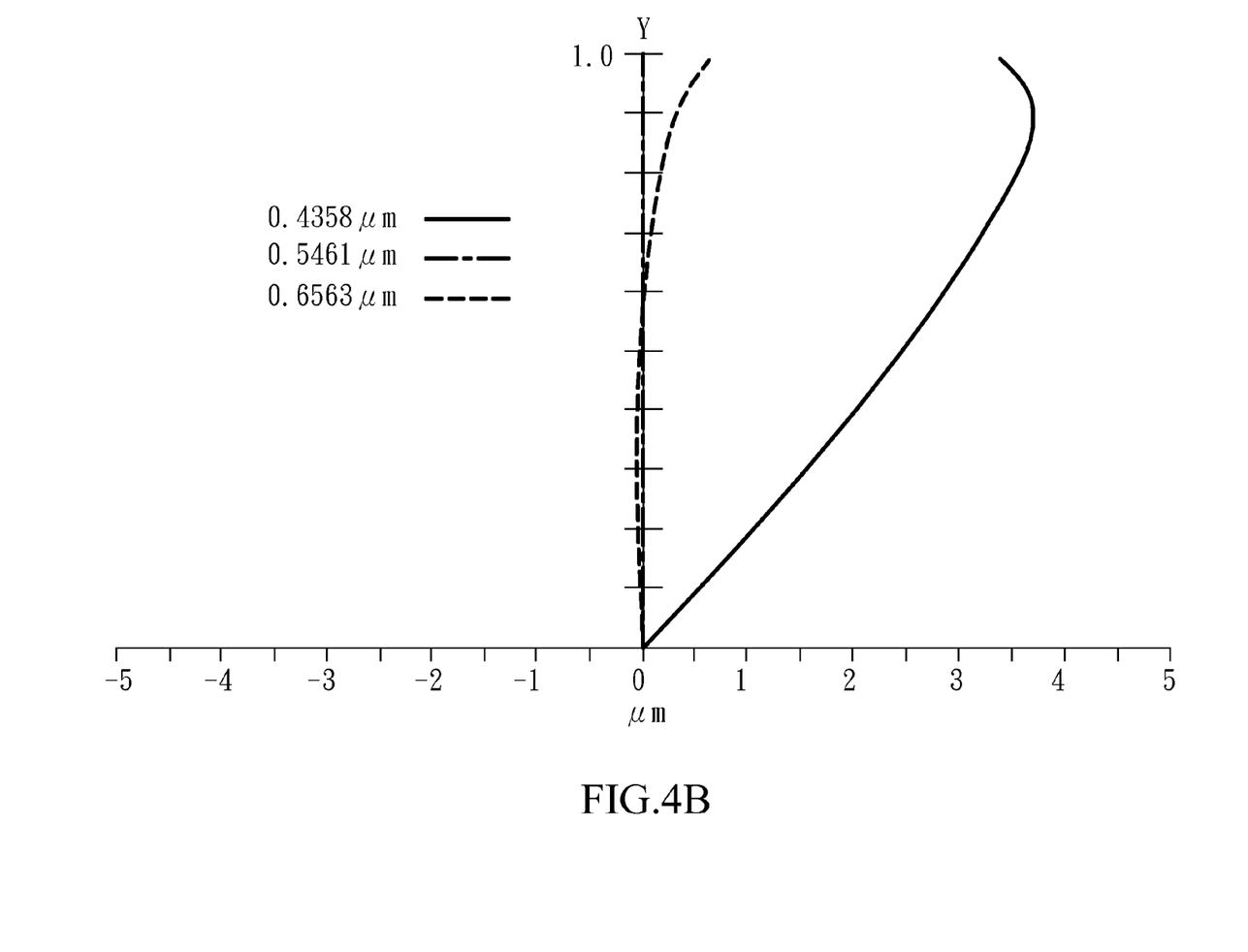

FIG. 4A and FIG. 4B respectively show the lateral color chart at the wide-angle end and the telephoto end, according to an example of this invention. As shown in the drawings, in the wide-angle end the lateral color aberration for image beams with wavelength 435.8 nm, 546.1 nm, and 656.3 nm are all set in the range of (0.000 mm, 0.007 mm) while (−0.00005 mm, 0.004 mm) in the telephoto end.

Figure 5A:
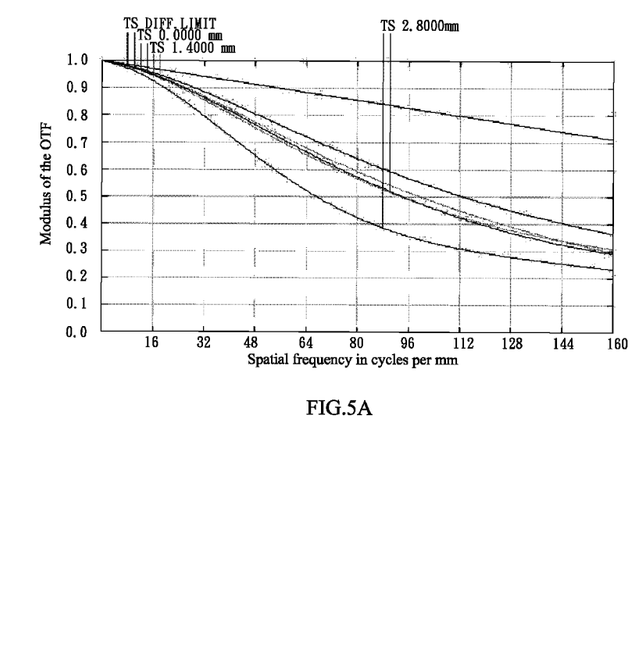
FIG. 5A and FIG. 5B, respectively, show the Modulation Transfer Function (MTF) chart at the wide-angle end and the telephoto end, according to an example of this invention.
Figure 5B:
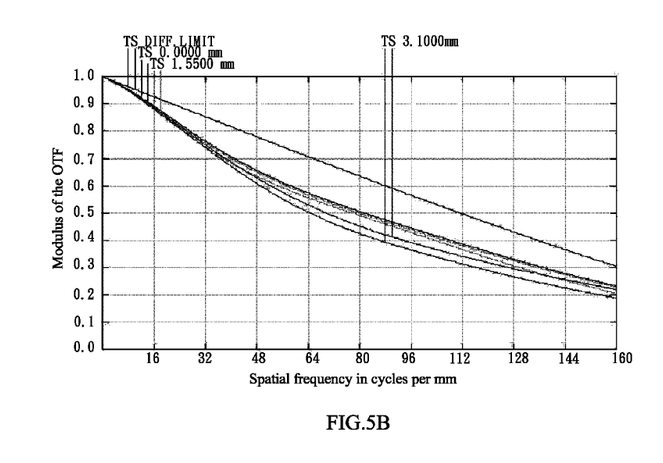

FIG. 5A and FIG. 5B respectively show the Modulation Transfer Function (MTF) chart at the wide-angle end and the telephoto end, according to an example of this invention.

The results from FIG. 2A-FIG. 5B show that the astigmatism, the distortion, the lateral color aberration, and the Modulation Transfer Function of the zoom lens can be properly adjusted. In addition, compared to conventional zoom lens, the zoom lens of this invention features the zoom ratio to 5.5, and the two plastic lenses of which lower the weight as well. In addition, the diameter of the aperture stop AS in this invention may be a constant, such that a conventional controllable diaphragm shelter may be omitted. Furthermore, the total thickness of the zoom lens can be less than 15 mm; therefore, additional mechanisms or structures for minimizing the accommodation space of the zoom lens may be omitted, and hence components can be simplified and the cost can be reduced. In view of the foregoing description, embodiments of the present invention provide zoom lenses having advantages of high zoom ratio and good image quality under the conditions of compact size and low cost.

Although specific embodiments have been illustrated and described, it will be appreciated by those skilled in the art that various modifications may be made without departing from the scope of the present invention, which is intended to be limited solely by the appended claims.

What is claimed is:

1. A zoom lens, comprising, in order from an object side:
a first lens group having negative refractive power;
a second lens group having positive refractive power; and
a third lens group having positive refractive power,
wherein the zoom lens satisfies the following conditions:
DG1/fw>0.72; DG2/fw<0.72; Wide Fno<2.8; and TTL<15 mm,
wherein, fw is a focal length of the zoom lens at a wide-angle end, DG1 is a thickness of the first lens group, DG2 is a thickness of the second lens group, "Wide Fno" denotes the F-number of the zoom lens at the wide-angle end, and TTL is a distance between the object side of the first lens group and an image-forming plane of the zoom lens.

2. The zoom lens as recited in claim 1, further comprises an aperture stop with a constant diameter.

3. The zoom lens as recited in claim 1, wherein the zoom lens further satisfies the following condition: Tele Fno<7.0, wherein "Tele Fno" denotes the F-number of the zoom lens at the telephoto end.

4. The zoom lens as recited in claim 1, wherein the first lens group, the second lens group and the third lens group respectively comprise at least one an aspheric lens or a free-form lens.

5. The zoom lens as recited in claim 1, wherein the zoom lens comprises a plurality of plastic lenses.

6. The zoom lens as recited in claim 1, wherein the first lens group comprises, in order from the object side to an image-forming side, a first lens having negative refractive power and a second lens having positive refractive power.

7. The zoom lens as recited in claim 6, wherein the first lens is a spherical lens, and the second lens is an aspheric lens or a free-form lens.

8. The zoom lens as recited in claim 6, wherein the first lens is a glass lens, and the second lens is a plastic lens.

9. The zoom lens as recited in claim 6, wherein a refractive index of the second lens is nd2, an Abbe number of the second lens is vd2, and the second lens satisfies the following conditions: nd2>1.6 and vd2<50.

10. The zoom lens as recited in claim 1, wherein the second lens group comprises, in order from the object side to an image-forming side, a third lens having positive refractive power, a fourth lens having positive refractive power, and a fifth lens having negative refractive power.

11. The zoom lens as recited in claim 10, wherein the third lens is an aspheric lens or a free-form lens, and the fourth lens and the fifth lens are spherical lenses.

12. The zoom lens as recited in claim 10, wherein the third lens, the fourth lens and the fifth lens are glass lenses.

13. The zoom lens as recited in claim 10, wherein the fourth lens and the fifth lens are glued to be a doublet lens.

14. The zoom lens as recited in claim 1, wherein the third lens group comprises a sixth lens having positive refractive power.

15. The zoom lens as recited in claim 14, wherein the sixth lens is an aspheric lens, a free-form lens or a plastic lens.

16. The zoom lens as recited in claim 14, wherein a refractive index of the sixth lens is nd6, an Abbe number of the sixth lens is vd6, and the second lens satisfies the following conditions: nd6<1.6 and vd6>50.

17. The zoom lens as recited in claim 1, further comprising an aperture stop disposed between the first lens group and the second lens group.

18. The zoom lens as recited in claim 1, further comprising a filter disposed between the third lens group and the image-forming plane.

19. An electronic device comprising the zoom lens claimed in claim 1.

20. The zoom lens as recited in claim 1, wherein the zoom lens further satisfies the following conditions: TTL/fw<7.0.

* * * * *